United States Patent

Harvey

[15] 3,659,681

[45] May 2, 1972

[54] LEVER ACTUATED DISK BRAKE

[72] Inventor: Dennis G. Harvey, Ancaster, Ontario, Canada

[73] Assignee: Allis-Chalmers Manufacturing Company, Milwaukee, Wis.

[22] Filed: Apr. 16, 1970

[21] Appl. No.: 29,140

[52] U.S. Cl. ................................188/72.9, 188/73.6
[51] Int. Cl. ...................................F16d 55/224
[58] Field of Search .............188/72.9, 73.3, 73.6, 72.6, 188/59, 76, 106 F

[56] References Cited

UNITED STATES PATENTS

| 2,924,302 | 2/1960 | Black | 188/72.3 |
|---|---|---|---|
| 3,035,664 | 5/1962 | Desvignes et al. | 188/72.9 |
| 3,213,969 | 10/1965 | Rosanowski et al. | 188/71.8 |

FOREIGN PATENTS OR APPLICATIONS

| 1,454,376 | 8/1966 | France | 188/72.9 |
| 1,477,747 | 3/1967 | France | 188/72.9 |

Primary Examiner—George E. A. Halvosa
Attorney—Charles L. Schwab, Robert B. Benson and Kenneth C. McKivett

[57] ABSTRACT

A compact disk brake having a pair of brake shoes floatingly mounted on a pair of pins and a brake operating lever which is operative to move the shoes into engagement with opposite sides of a brake disk. One of the shoes is U-shaped and presents two pairs of openings through which the pins extend.

7 Claims, 4 Drawing Figures

PATENTED MAY 2 1972  3,659,681

Inventor
Dennis G. Hoppner
By Charles L. Schwab
Attorneys

LEVER ACTUATED DISK BRAKE

This invention relates to a compact disk brake assembly and particularly to the construction and interrelationship of disk brake components permitting them to float axially in relation to a brake disk so as to insure equal opposing force against opposite sides of the disk during braking.

It is an object of this invention to provide a very compact disk brake assembly having a minimum of components.

It is a further object of this invention to provide a disk brake assembly wherein the brake shoes are mounted on axially extending elements which not only maintain the brake shoes against radial and rotational movement but also permit floating axial movement so that the brake shoes can apply equal force to opposite sides of the disk being braked.

It is a further object of this invention to provide a disk brake assembly of the type hereinbefore outlined wherein one end of a brake operating lever is supported by at least one of the brake shoes.

It is a further object of this invention to provide a disk brake assembly of the hereinbefore outlined character wherein one of the shoes is U-shaped and the other shoe is disposed intermediate the legs of the U-shaped shoe.

These and other objects of this invention will be apparent when the following description is read in conjunction with drawings in which.

Figures 1, 2, 3, 4:
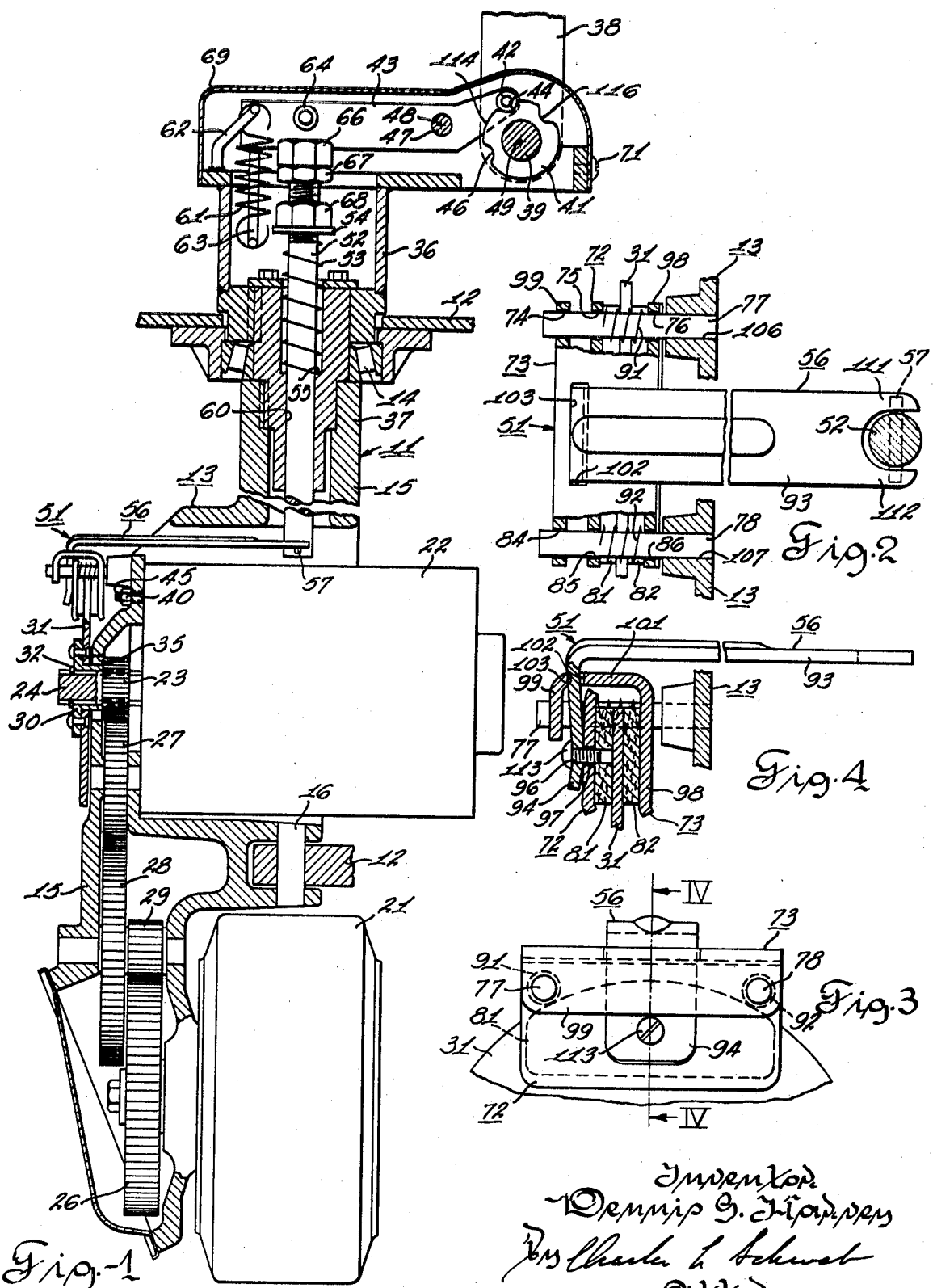
FIG. 1 is a vertical section view of a single wheel drive and steer assembly of a walkie-type lift truck incorporating the present invention.
FIG. 2 is a top view of the disk brake assembly of the present invention with some parts shown in section.
FIG. 3 is an end view of the disk brake assembly shown in FIG. 1.
FIG. 4 is a section view taken along the line IV—IV in FIG. 3.

Referring to FIG. 1, the present invention is shown incorporated in a steerable one-wheel drive assembly 11 of a walkie-type lift truck. The drive or motor wheel assembly 11 includes a support 13 including a cast housing 15 which is rotatably supported on the main frame 12 of the truck by a tapered roller bearing 14 and a pin 16. It should be understood that the lower part of support 13 is rotated 90° in relation to the upper part for purposes of illustration and description. A drive wheel 21 is rotatably mounted on the lower end of the support 13 and has a final drive gear 26 fixed thereto. The drive wheel 21 is driven by an electric DC motor 22 through a gear train which includes a drive gear 23 splined on the motor output shaft 24, the final drive gear 26 and intermediate gears 27, 28, 29. Gears 28, 29 form a gear cluster. The horizontally disposed output shaft 24 of motor 22 carries a brake disk 31 having a hub 30 which has an internal spline in cooperative engagement with the externally splined end of shaft 24. The hub 30 of the disk 31 has an axially extending portion extending through an opening 35 in housing 15 and abutting the axially outer side of drive gear 23. The disk 31 is held in place on the shaft 24 by a conventional snap ring 32.

The motor 22 is releasably secured to the support 13 by a plurality of nuts 40 on studs 45, only one nut and one stud being shown. Thus, the motor 22 can be quickly removed for replacement or repair by removing the snap ring 32 and the nuts 40 from studs 45 extending from the motor 22 through suitable openings in the housing 15. It should be understood that the electrical leads, not shown, for the motor 22 would need to be disconnected in order to remove the motor from the truck.

A handle support portion 36 is rigidly secured to the neck 37 of the housing 15 and a control handle 38 is pivotally connected to the handle support portion 36 by a pin 39 fixed to handle. The pin 39 carries a brake operating cam 41. A suitable cover 69 is secured to portion 36 by cap screws 71, only one of which is shown. In the upright position of the handle 38, as illustrated, and in a horizontal position, a roller 42 pivotally connected to one end of a pivot link 43 fits in pockets 44 and 46, respectively, of the cam 41 to achieve braking of the motor shaft 24 by brake assembly 51. The link 43 is pivotally connected by a pin 47 to the handle support portion 36 on an axis 48, which is in spaced relation to axis 49 of pin 39, and is biased, so that the roller 42 bears against the cam 41, by a tension spring 61. The spring 61 is connected at its opposite ends to brackets 62, 63 which are welded to portion 36 and link 43, respectively. The link 43 carries a roller 64 which is in vertical thrust transmitting relation to the upper end of a vertical rod 52.

The rod 52 is guided by a bore 60 in support 13 so as to have a substantially coaxial relationship with bearing 14 and pin 16. The lower end of rod 52 carries a pin 57 in vertical thrust transmitting engagement with the bottom of the free end of brake operating lever 56 and is biased upwardly to a brake engaging position by compression spring 53 acting at its upper end against a washer 54, and at its lower end against a shoulder 55 of the support 13. The tension and, hence, the brake engaging force of spring 53 can be adjusted by adjusting the position of the spring tension nut 68 on the upper threaded end of rod 52. Also, the length of rod 52 can be adjusted by changing the axial position of end nut 66. Nut 66 may be adjusted initially to obtain proper brake operation and subsequently to compensate for wear of the brake shoe pads. A conventional lock nut 67 is employed to maintain the selected position of nut 66.

As illustrated in the drawings, a pair of brake shoes 72, 73 are mounted for free axial movement on a pair of axially extending elements in the form of pins 77, 78 press fit in bores 106, 107 of support 13. The free end of pin 77 extends through aligned openings 74, 75, 76 and the free end of pin 78 extends through aligned openings 84, 85, 86 of the shoes 72, 73. Shoe 73 is U-shaped with the openings 74, 84 formed in the outer leg 99 and the openings 76, 86 formed in the inner leg 98. The bridging portion 101 interconnecting the legs 98, 99 is disposed radially outwardly of the radially outer periphery of the disk 31 and pins 77, 78 are disposed intermediate the bridging portion 101 and the disk 31. Brake pads 81, 82 of suitable friction material are bonded by suitable means to axially confronting sides of shoe 72 and leg 98. As shown in FIG. 3, the upper surface of the pads is curved to correspond approximately with the periphery of the disk thereby insuring relatively uniform wear of the pads. A pair of coil compression springs 91, 92 encompass pins 77, 78, respectively, and serve to bias the shoes and their pads axially away from one another and thus, out of engagement with the disk 31. These back-off springs 91, 92 are, however, relatively weak in relation to the engaging force effected by coil spring 53 through the L-shaped brake operating lever 56.

As shown in FIG. 2, the free end of the horizontally disposed arm 93 of lever 56 is bifurcated with ears 111, 112 resting on top of the opposite ends of pin 57. The other end of arm 93 is integrally joined to a downwardly extending arm 94, the bottom end of which bears axially against the side of shoe 72 remote from its pad 81. The arm 94 is held against vertical movement by fastening means in the form of a screw 113 in threaded engagement with a drilled and tapped opening 96 in arm 94 and extending into drilled opening 97 in shoe 72. The arm 94 of lever 56 extends downwardly through a slot 102 in the bridging portion 101 of the shoe 73 and has an intermediate portion in abutment with an abutment surface 103 of the slot 102. Thus, when the rod 52 is moved upwardly, the abutment surface 103 serves as a fulcrum for the lever 56 as it moves from its illustrated brake engaging position clockwise to its brake disengaging position.

OPERATION

When the handle is in the illustrated upright position (or in a horizontal position), the brake assembly is in an engaged condition since the roller 64 is in its uppermost position out of engagement with rod 52 thereby allowing the brake engaging spring 53 to expand, thus moving the rod 52 upwardly. Upward movement of the rod 52 moves the free end of arm 93 of the L-shaped lever 56 upwardly, thereby forcing the shoe 73 to move to the left and the shoe 72 to move to the right. Since the shoes 72, 73 are in axially floating relation to their mounting pins 77, 78 and the arm 93 of the lever 56 can shift horizontally in relation to rod 52, the shoes and lever will adjust their position so that equal braking force is applied to opposite axial sides of the disk 31. In my extremely compact brake assembly, the pins 77, 78 not only support the shoes for floating axial movement but also hold the shoes against rotation and radial movement, keep the shoes in assembly and mount the back-off springs 91, 92.

When the operator's steer and control handle 38 is moved clockwise from the automatic braking position of FIG. 1, the roller 42 will cam out of recess 44 onto surface 114 of cam 41 causing the link 43 to rotate counterclockwise whereby the roller 64 will abut against the upper end of rod 52 moving it downwardly compressing spring 53. This will permit the brake operating lever 56 to pivot clockwise about abutment surface 103 under the expanding bias of back-off springs 91, 92, thus allowing disengagement of the pads of the brake shoes from the disk 31. The brake control is designed to provide an additional braking position, when the operator rides on the load platform or forks of the truck, by provision of recess 116 in cam 41. When the operator rides the load platform or forks, he will move the handle 38 counterclockwise from the illustrated position to release the brake. Further counterclockwise rotation of the handle 38 about its axis 49 brings recess 116 into registration with roller 42, thus permitting the spring 53 to apply the brake. When standing on the forks or platform of the truck, it is more convenient for the operator to move the control handle to this last mentioned position for braking the truck than using the illustrated upright braking position of handle.

The brake assembly may be disassembled for repair or replacement by simply removing the snap ring 32 and withdrawing the disk 31 from the drive shaft 24. The shoes 72, 73 together with lever 56 and springs 91, 92 will slide outwardly off the pins 77, 78 as disk 31 is slipped off the shaft 24.

The embodiments of the invention in which an exclusive property or privilege is claimed are defined as follows:

1. In a vehicle having a wheel rotatably mounted on a support and including a rotatable part which rotates whenever the wheel rotates, a braking mechanism comprising:
   a disk secured to said rotatable part for rotation therewith,
   a pair of spaced elongated elements rigidly secured at their corresponding ends to said support and having free ends extending axially from said support in parallel relation to one another,
   a first brake shoe having
      a first leg on one axial side of said disk,
      a second leg on the opposite axial side of said disk,
      a bridging portion spaced radially of said disk, rigidly interconnecting said legs and presenting an opening for receiving an operating lever, and
   first and second pairs of aligned openings in said legs through which said free ends of said elements extend,
   a second brake shoe disposed on the opposite side of said disk intermediate the latter and said second leg of said first brake shoe including a pair of openings through which said free ends of said elements extend, said shoes being mounted in axially shiftable relation on said elements,
   an abutment surface in said opening of said bridging portion, and
   an operating lever extending through said opening and having spaced portions in axially opposite thrust transmitting engagement with said abutment surface and said second brake shoe, respectively,
   said free ends of said elongated elements being smaller in cross section than said openings, respectively, whereby said shoes are readily removable from said elements.

2. The invention of claim 1 wherein said portions of said lever are spaced radially from one another as related to said disk.

3. The invention of claim 1 wherein said elements are disposed intermediate said bridging portion and said disk.

4. The invention of claim 1 wherein said lever extends between said elements and is supported on one of said shoes.

5. The invention of claim 1 and further comprising a pair of coil springs encompassing said elements, respectively, and disposed between and acting in opposite directions on said shoes.

6. The invention of claim 1 wherein said shoes are removable axially from said elements upon axial removal of said disk from said rotatable part.

7. The invention of claim 6 wherein said disk is releasably secured to said rotatable part.

* * * * *